United States Patent [19]
Kitagawa et al.

[11] Patent Number: 5,678,067
[45] Date of Patent: Oct. 14, 1997

[54] MOTION COMPENSATION DEVICE HAVING STABILIZING MOTION DETECTION UNIT THAT DOES NOT INHIBIT IMAGING OPERATIONS IN AN IMAGING UNIT

[75] Inventors: Yoshihisa Kitagawa, Kashiwa; Yoshio Imura, Kawasaki, both of Japan

[73] Assignee: Nikon Corporation, Tokyo, Japan

[21] Appl. No.: 742,151

[22] Filed: Oct. 31, 1996

Related U.S. Application Data

[62] Division of Ser. No. 479,399, Jun. 7, 1995.

[30] Foreign Application Priority Data

Jun. 7, 1994 [JP] Japan .................. 6-125467

[51] Int. Cl.$^6$ .................. G03B 5/00; G03B 7/00
[52] U.S. Cl. .................. 396/55; 396/212; 396/246
[58] Field of Search .................. 396/55, 52, 246, 396/250, 212

[56] References Cited

U.S. PATENT DOCUMENTS

| | | | |
|---|---|---|---|
| 5,353,091 | 10/1994 | Ishida et al. | 396/55 |
| 5,539,496 | 7/1996 | Wakabayashi et al. | 396/55 X |
| 5,576,787 | 11/1996 | Kai et al. | 396/55 |

Primary Examiner—W. B. Perkey

[57] ABSTRACT

A motion compensation device includes a detection unit detecting an amount of motion about a camera, a photographic preparatory operation commencement instruction unit generating a first instruction to commence photographic preparatory operations including the commencement of the detection unit, and a photographic operation commencement instruction unit generating a second instruction to commence photographic operations, a motion compensation unit to drive a photographic optical system of the camera to inhibit image blurring on a focal plane based on the amount of motion detected by the detection unit, and a stabilization time determination unit determining whether the photographic preparatory time from when the photographic preparatory operation instruction unit generates the first instruction until the photographic operation commencement instruction unit generates the second instruction is longer or shorter than a predetermined amount of time. The predetermined amount of time is long enough to allow the operation of the detection unit to become stable. Also provided is a control unit that controls the motion compensation unit so as to inhibit operation thereof when the stabilization time judgment unit judges that photographic preparatory time is shorter than the predetermined time. Finally, the motion compensation device inhibits motion compensation after commencement of an exposure period in order to conserve power in an imaging unit that embodies the invention.

3 Claims, 6 Drawing Sheets

MOTION COMPENSATION DEVICE HAVING STABILIZING MOTION DETECTION UNIT THAT DOES NOT INHIBIT IMAGING OPERATIONS IN AN IMAGING UNIT

This application is a division of application Ser. No. 08/479,399, fild Jun. 7, 1995, now pending.

BACKGROUND OF THE INVENTION

1. Field of the Invention

The present invention relates to a motion compensation device which detects vibration and other motions about a camera at a time of photography and which performs appropriate compensation operations.

2. Description of the Related Art

Recent developments in cameras have allowed such devices to be lighter and smaller than had been previously realized. Interestingly, however, such lighter cameras often leave photographers disinclined to perform extended shutter time photography (i.e., photography utilizing shutter speeds of relatively long periods of time). As such, light-weight cameras often realize blurred photographs due to the hand tremor of the photographer, especially during use of extended shutter time photography.

On the other hand, prior art cameras make it possible to effectively draw out the good qualities of a subject, while effectively expressing the intention of the photographer since such prior art cameras are smaller, lighter and easier to use to capture photographs. However, there are cases in which photography is intentionally performed using a slowed shutter speed, and there are cases where slow shutter speeds inevitably have to be used because of the luminosity of a subject, the sensitivity of a film or the clarity of a particular lens that is used. In these cases, the options of using a tripod, increasing the sensitivity of the film, using an expensive lens of large aperture, arose for the photographer in order to prevent or compensate for the effects of motion realized by a camera.

Optical systems project images onto an image plane such as film, for example. Conventional image blur suppression devices suppress, or reduce, blurring of an image. A motion compensation device is a type of image blur suppression device, and compensates for motion incident upon the optical system. Motion is typically imparted to the optical system by vibrations in the optical system, or on a surrounding holding member. In general, conventional motion compensation devices cause a compensation lens to shift counter to the motion of the optical system so as to shift the image projected by the optical system relative to the optical system. Conventional cameras use a motion compensation device to suppress image blur resulting from motion of the camera. Such motion is typically caused by hand tremors of a photographer.

In the kinds of situations discussed above, motion compensation devices have been proposed which compensate within the camera or lens for the vibration due to the photographer's hand tremor and the like. Such prior art motion compensation devices typically included a sensor to detect vibration of the camera which was built into the camera or lens, and to produce an electrical signal indicative of the hand tremor and the like, From the generated signal, the amount and direction of the amount of displacement of the subject image on the film plane was calculated, and by shifting a portion of the photographic optical system so as to negate the amount and direction of this amount of displacement, control was effected such that the subject image relatively did not move on a film plane, so as to negate the effects of motion of the camera.

However, such prior art motion compensation devices often operate in such a manner in which motion compensation is performed during an entire exposure period. Such operation often wastes precious camera battery life. Moreover, when the exposure was begun directly after the commencement of motion detection operations, motion compensation errors arose because sufficient preparatory time was not taken for motion compensation control.

In other words, in the case that an angular velocity sensor was used to detect relative angular velocity based on data from a beginning time of detection, a controller was caused to calculate an angular velocity prior to the point in time that the angular velocity sensor was stabilized or reset. In theory, an angular velocity contstituting a standard (e.g., angular velocity=0) and an absolute angular velocity could be calculated by means of the difference of an output with respect to the standard, and furthermore, the motion compensation drive amount could be calculated in accordance therewith. However, a given time or possibly more, was required until the detection of the angular velocity sensor was stabilized.

For the aforementioned reason, the output of the sensor was not stable directly after the beginning of detection, and therefore lacked reliability. Specifically, as one example of a method of calculation of the angular velocity=0, the average of the whole output from after the beginning of detection can be taken as the angular velocity=0. However, for this method of calculation, some amount of time has to elapse until the accuracy of the calculated angular velocity increases. Accordingly, the passage of time was necessary for the angular velocity sensor and corresponding output value to become stable.

Moreover, in cases in which the beginning of the exposure was delayed in order to maintain the time for motion compensation control to be a fixed time, the risk of losing a photograph became quite real, thereby negating camera reliability. Moreover, even if the preparatory time for motion compensation control could be maintained, in the case when the exposure time became long, errors arose in the value of the aforementioned angular velocity, and the possibility arose that motion compensation errors accumulated as time went on often resulting in a blurred photograph.

And in the case of illuminated photographs, because the exposure of the principal subject is completed in a short time when light is generated by a light generating device, the principal subject is not blurred in the photograph. In other words, in the case of using a light generating device, the generation of a blurred photograph originates in blurring of the background, and it is well known that the performance of such a blurred exposure of the background takes place in the time when the light generating device is not generating light. Accordingly, during the time of light generation or during a fixed time before and after such illumination, because the blurring motion of the principal subject does not arise, even if a blurring motion compensation drive were performed, such operation would only waste precious battery life.

SUMMARY OF THE INVENTION

Accordingly, it is an object of the present invention to solve the aforementioned problems, and to provide a motion compensating device which can more accurately perform the correction of blurring motions about a camera, without wasteful consumption of electric power, and without the generation of blurring motion compensation errors.

It is a further object of the present invention to inhibit the blurring motion compensation drive for a fixed time during exposure operations, for example, for a time while the amount of movement of the subject image on the film plane during the exposure is imperceptible to the human eye.

The inhibited time, when it is from the commencement of the exposure time up to a predetermined time, can be allocated to a stabilization time during which time the output of a blurring motion detection unit stabilizes.

Moreover, when the time for which the motion compensation drive is inhibited is set as directly before the completion of the exposure time, it becomes possible to use the exposure time as the standard time for the next operation. For example, in photography using rapid succession, the frames per unit time can be increased.

Additional objects and advantages of the invention will be set forth in part in the description which follows, and, in part, will be obvious from the description, or may be learned by practice of the invention.

Objects of the present invention are achieved in a motion compensation device that includes a detection unit detecting an amount of motion about a camera, a photographic preparatory operation commencement instruction unit generating a first instruction to commence photographic preparatory operations including the commencement of the detection unit, a photographic operation commencement instruction unit generating a second instruction to commence photographic operations, a motion compensation unit to drive a photographic optical system of the camera to inhibit image blurring on a focal plane based on the amount of motion detected by the detection unit, a stabilization time judgement or determination unit judging whether the photographic preparatory time from when the photographic instruction is longer or shorter than a predetermined amount of time, the predetermined amount of time being long enough to allow the operation of the detection unit to become stable and a control unit controlling the motion compensation unit so as to inhibit operation thereof when the stabilization time judgement unit determines that photographic preparatory time is shorter than the predetermined time.

Objects of the present invention are also achieved by a motion compensation device adapted for use in a camera. The motion compensation device includes, but is not limited to, an exposure time setting unit setting a camera shutter speed, a motion detection unit detecting an amount of motion about the camera, a photographic preparatory action commencement instruction unit generating an instruction to commence photographic preparatory action including starting the motion detection unit, a photographic operation commencement instruction unit generating an instruction to commence photographic operations in accordance with the shutter speed set by the exposure time setting unit, a motion compensation unit driving a photographic optical system of the camera in a direction so as to reduce image blurring on a focal plane based on the amount of motion detected by the motion detection unit, a stabilization time judgement or determination unit judging whether the photographic preparatory time is longer or shorter than a predetermined time, the predetermined time being an amount of time necessary for the motion detection unit to become stable, a control unit controlling the motion compensation unit so as to inhibit operation thereof when the stabilization time judgement unit judges that photographic preparatory time is longer than the predetermined time.

Additionally, objects of the present invention are achieved by a motion compensation device adapted for use with a camera that includes, but is not limited to, a motion detection unit detecting an amount of motion about the camera, a motion compensation unit driving a photographic optical system of the camera in order to compensate for the effects of the motion about the camera based on the amount of motion detected by the motion detection unit, a flash unit for increasing the luminosity of a subject, a selection unit for selecting whether the light generation timing of the flash unit is to be synchronized with a front shutter blind or a rear shutter blind of the camera and a control unit controlling the motion compensation unit so as to inhibit operation thereof when the selection unit selects front shutter blind synchronization and until a predetermined time elapses and until the motion detection unit become stable.

Objects of the invention are yet further achieved by a motion compensation device adapted for use with a camera that includes, but is not limited to, an exposure time setting unit for setting a shutter speed within the camera; a motion detection unit detecting motion about the camera, a motion compensation unit driving a photographic optical system of the camera in accordance with the motion detected by the motion detection unit, a flash unit for illuminating a subject, a selection unit for selecting whether light generation timing of the flash unit is synchronized with a front shutter blind of the camera or is synchronized with a rear shutter blind of the camera and a control unit controlling the motion compensation unit so as to inhibit operation thereof when the selection unit selects rear blind synchronization for a tolerance time before the exposure completion as set by the exposure time setting unit.

Yet further objects of the invention are achieved by a motion compensating device adapted for use with a camera that includes, but is not limited to, an exposure time setting unit for setting a shutter speed within the camera, a motion detection unit detecting motion about the camera, a motion compensation unit driving the motion detection unit, a shutter time determination unit determining the exposure time set by the exposure time setting unit and a control unit controlling the motion. compensation unit so as to inhibit operation thereof when the shutter time determination unit has determined that the shutter speed set by the exposure time setting unit is greater than a predetermined time, the inhibition of the motion compensation unit lasting for as long as a tolerance time such that the amount of movement of the image on a focal plane moves to an imperceptible degree and directly before an exposure completion which has been set by the exposure time setting unit.

BRIEF DESCRIPTION OF THE DRAWINGS

Objects and advantages of the present invention will become apparent and readily appreciated from the following description of the preferred embodiments, taken in conjunction with the accompanying drawing figures, of which.

DETAILED DESCRIPTION OF THE PREFERRED EMBODIMENTS

Figure 1:
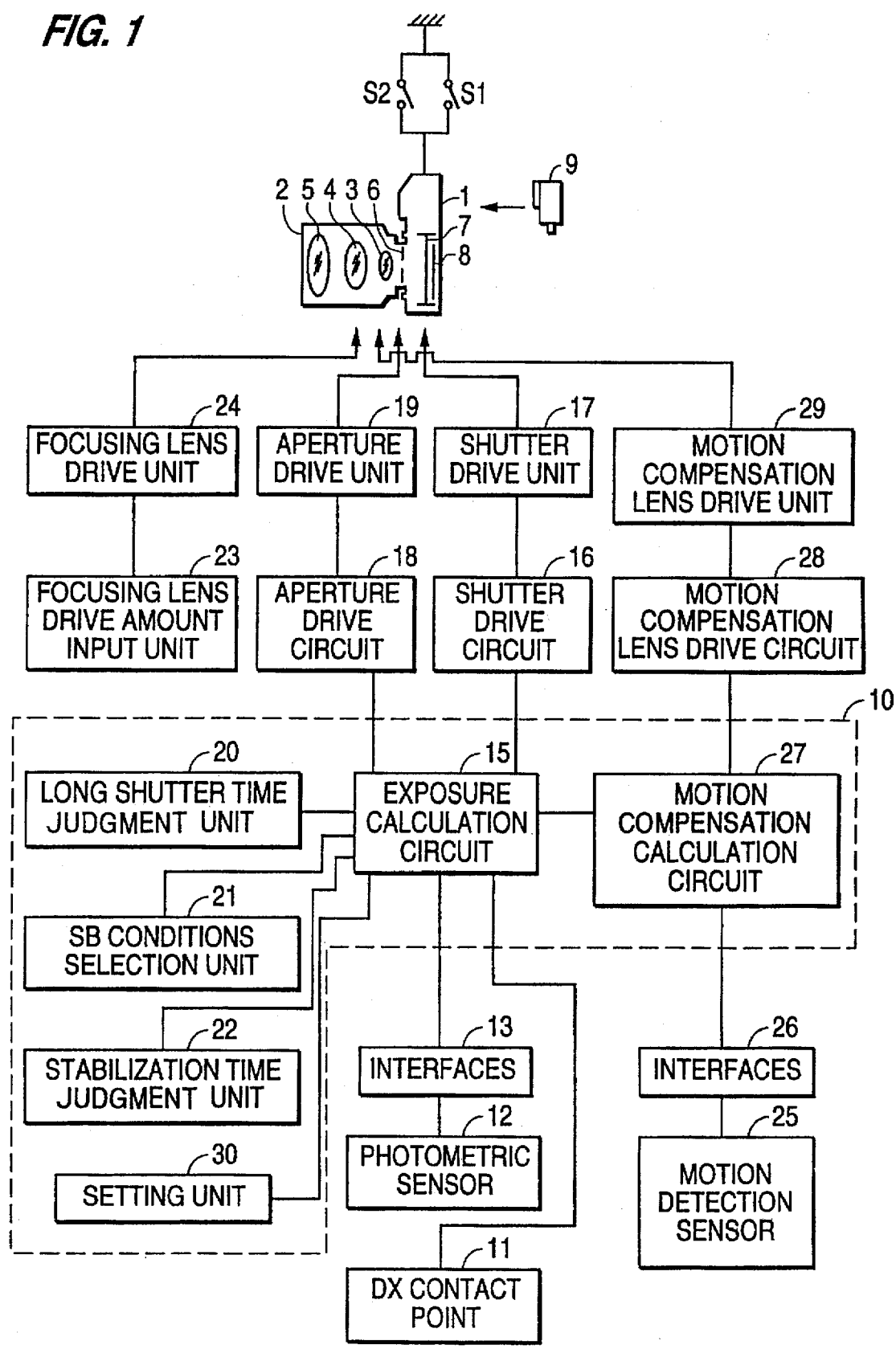
FIG. 1 is a block diagram illustrating a camera equipped with a motion compensation device according to a preferred embodiment of the present invention.

The following description is provided in reference to the drawing figures which were briefly described above. Like parts are referred to by like reference numerals.

According to the detailed description of the preferred embodiment, the present invention is described as relating to a camera. However, the present invention is not intended to be limited to a camera. For example, the present invention can be used in devices including, but not limited to, camcorders, motion picture cameras, telescopes, binoculars, microscopes, rangefinding equipment, lasers, fiber optic communications systems, various optical projections systems and optical disk mastering systems.

Figure 2:
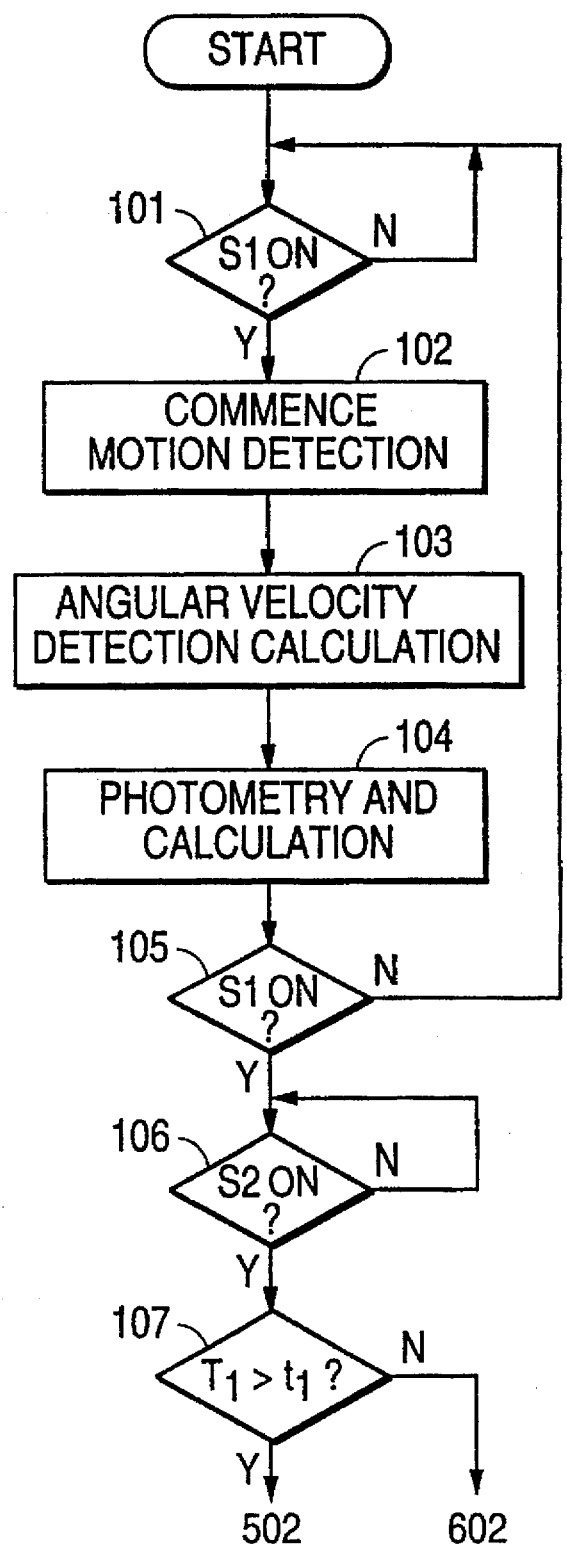
FIG. 2 is a flow chart that illustrates the operations of a control circuit of a motion compensation device according to a first embodiment of the present invention.
Figure 5:
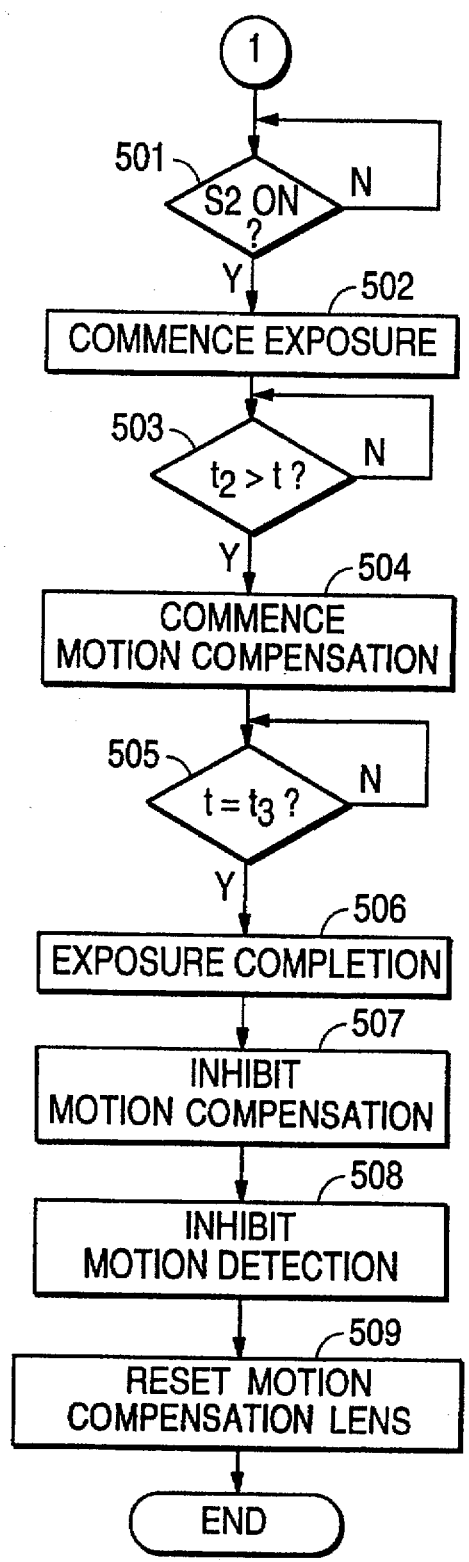
FIG. 5 is a flow chart that illustrates further operations of the control circuit depicted in FIGS. 1–3.
Figure 6:
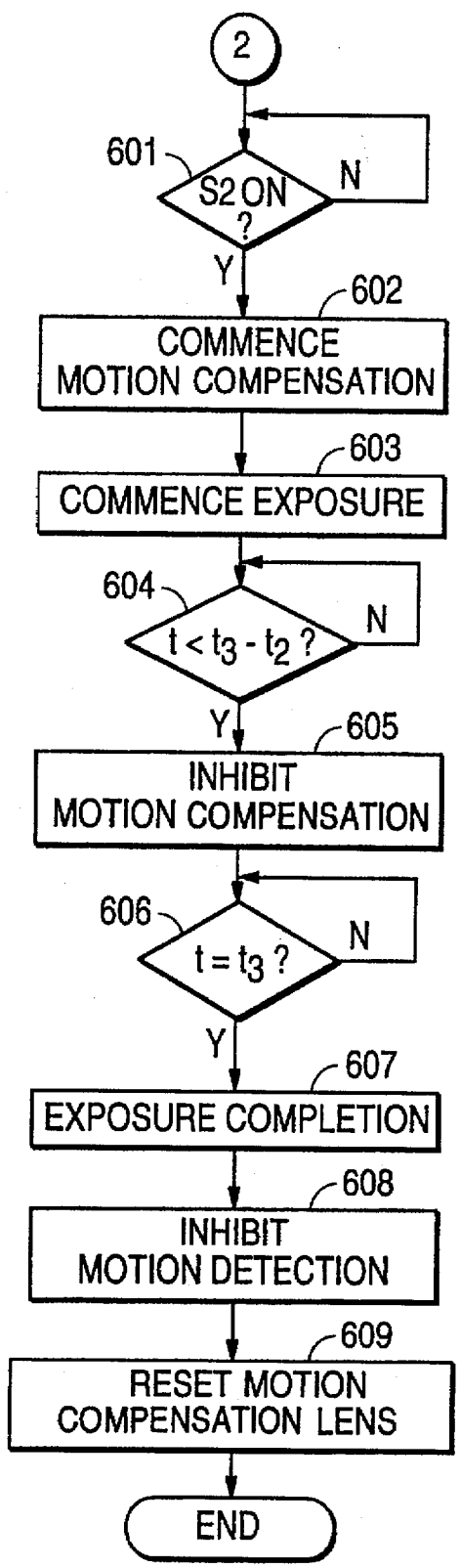
FIG. 6 is a flow chart that illustrates further operations of the control circuit depicted in FIGS. 1–3.

Referring now to FIG. 1, therein depicted is a block diagram of a camera incorporating a motion compensation device according to a first preferred embodiment of the present invention. FIGS. 2, 5 and 6 are flow charts which illustrate the operations of the control circuit of the motion compensating device according to the first embodiment depicted in FIG. 1.

The camera is equipped with a camera body 1 and a lens body 2. In the lens body 2, a motion compensating lens group 3 is provided which performs motion compensation by having its optical axis change. Additionally provided is a focusing lens group 4 that moves in the direction of the optical axis to perform focus adjustment. Also, a typical fixed lens group 5 is provided.

Light from a subject passes through the respective lens groups 5, 4 and 3, and is thereafter passed onto a film 8 loaded into the camera body 1 to form a subject image on the surface of film 8. Moreover, an aperture 6 is arranged rearward (on the film side) of the motion compensating lens group 3, and a shutter 7 is arranged directly in front of the film 8. These respective lens groups and mechanisms are controlled by a control circuit 10 comprising a computer built into the camera body 1 or lens body 2.

Control circuit 10 is a central controlling circuit which performs control for the camera and is equipped with an exposure calculation circuit 15 and motion compensation calculation circuit 27.

The exposure calculation circuit 15 has a direct input corresponding to the output of a DX contact point 11, and an input corresponding to the output of a photometric sensor 12. These inputs are sent to exposure calculation circuit 15 via interfaces 13. The DX contact point 11 is located in the film compartment of the camera body 1 and is configured to read the DX code including ISO sensitivity that is recorded on a film container in a conventional manner. Moreover, the photometric sensor 12 is a sensor for photometry of the luminosity of the subject.

The exposure calculation circuit 15, based on the values read out from the DX contact point 11 and photometric sensor 12, drives the aperture 6 via the aperture drive circuit 18 and the aperture drive unit 19, and drives the shutter 7 via the shutter drive circuit 16 and the shutter drive unit 17.

A light generating device 9, which may be built into or mounted on the camera body 1, generates light during exposure time, when the exposure calculating circuit 15 has determined that the luminosity of the subject is insufficient, or when set by a setting unit (not shown in the drawing) so as to generate light, by way of a light generation indication signal. Light generation timing is such that light generation device 9 illuminates directly after the shutter blind is opened, and directly before the rear shutter blind closes. Light generating device comprises three optional timings within this interval; these can be optionally set by the photographer by way of the setting unit (not shown in the drawing), Moreover, the timing of light generation can be determined by an amount of motion realized by the camera during an exposure. For example, the generation of light can be caused when it is determined that the amount of motion is maximum during the exposure, or when it has exceeded a previously set amount, etc. In this manner, light generation can be used to shorten shutter time to thereby minimize the chances for a blurry photograph.

The focusing lens drive amount input unit 23 is present in order to input the drive amount of the focusing lens group 4. The output of unit 23 is connected to the focusing lens drive unit 24. The focusing lens drive unit 24 drives the focusing lens group 24 according to the drive amount input from unit 23, and the desired focal distance can be obtained by movement in the optical axis direction.

The motion compensation calculation circuit 27 inputs the output of a motion detection sensor 25 via interfaces 26. The motion detection sensor 25 is built into the camera body 1 or the lens body 2, and is a sensor to detect minute movements or motions about and/or realized by the camera. For example, such a sensor could be an acceleration sensor which detects vibration, an angular velocity sensor which detects rotary vibration, an angular acceleration sensor, an angle sensor or an optical sensor which detects image vibration of a subject image which is imaged on a CCD (electrical charge transmission element). In any event, when there are movements about camera body 1 or lens body 2, motion detection sensor 25 can be used to detect vibration of the camera body 1 or lens body 2 or both.

The motion compensation calculation circuit 27 is a circuit which based on the output of motion detection sensor 25, calculates a position or velocity, acceleration, angle, angular velocity, angular acceleration, and the like, as a standard, and with such a standard, calculates the drive amount and drive direction of the motion compensation lens group 3 such that the subject image does not move on film 8. The output of motion compensation calculation circuit 27, of course, is supplied to the motion tens drive unit 29 via the motion compensation lens drive circuit 28. The motion compensation lens drive unit 29 includes by motors and the like and, based on a shift amount of the motion compensation lens group 3 calculated by the motion compensation calculation circuit 27, causes driving of motion compensation lens group 3 in directions at right angles to the optical axis of the motion compensation lens group 3.

Moreover, the exposure calculation circuit 15, a long shutter time judgment unit 20, a SB conditions determination unit 21, a stabilization time judgment unit 22, and the motion compensation calculating circuit 27, based an respective mutual information, control the series of operations beginning from the depression of the release button (not shown in the drawing) through the subject image being exposed onto the film 8.

As embodied herein, the present invention operates in such a manner that during photographic operations and in predetermined conditions, motion compensation can be inhibited for predetermined time periods. Additionally, the predetermined time can be changed via a variable unit (not shown in the drawing). Moreover, in the present preferred embodiment, an angular velocity sensor detects relative angular velocities used to detect the amount of motion about a camera. However, embodiments of the present invention are not to be so limited as any sensor can be used which detects a relative amount of motion can be used.

The control operations of the structures described above is described in detail below with reference to the flow charts of FIGS. 2, 5 and 6.

At step 101, it is determined whether or not the photographer has half depressed the release button (hereinafter referred to as "S1"). If so, motion detection sensor 25 commences motion detection (step 102). The motion compensation calculating circuit 27, based on the output of the motion detection sensor 25, operates and calculates the angular velocity to become the standard value (step 103).

After reading the ISO sensitivity from the DX code of the film 8 by way of the DX contact point 11, and measuring the subject luminosity by way of the photometric sensor 12, photometric calculation is performed by way of the exposure calculating circuit 15 (step 104). Then, the state of 81 is confirmed (step 105).

In the case that S1 is OFF, processing returns to step 101.

In the case that S1 is ON, stabilization time judgment unit 22 judges if the photographic preparatory time (t1) up to full depression of the release button (hereinafter referred to as "S2") is shorter than a predetermined time (T1) (step 107). If so, processing proceeds to step 106 where it is determined if full depression of the shutter release button has occurred. If so, processing proceeds to step 502 of FIG. 5, and if not, there is a wait until such time as a full depression occurs.

In the present preferred embodiment, t1 can be considered to be the interval from S1 to S2 and T1 can be considered as the stabilization time necessary for the output of the motion detection sensor 25 to stabilize or to become accurate.

The operations of step 502 and thereafter will next be described by reference to FIG. 5. The exposure is commenced, with the exposure calculation circuit 15 causing driving of the aperture 6 and the shutter 7. Until a time (t2), which is a portion of the whole exposure time (t3), elapses from after the commencement of the exposure, the motion compensation lens drive circuit 28 waits without outputting a motion compensation signal. Thereafter, when a time t2 from the commencement of the exposure has elapsed (step 503), the motion compensation drive circuit 28 immediately outputs a motion compensation signal, and driving of the motion compensation lens group 3 is commenced via the motion compensation lens drive unit 29 (step 504). Time t2 can be considered as the time which is left after taking the stabilization time from the photographic preparatory time (i.e., t2=t1−T1).

When the time elapsed (t) after the commencement of the exposure reaches t3 (step 505), the exposure calculation circuit 15 immediately causes the termination of the exposure and drives the aperture 6 and the shutter 7 (step 606) accordingly. Then, the motion compensation calculating circuit 27 outputs an inhibition signal in order to inhibit the motion compensation by the motion compensation lens group 3 via the motion compensation lens drive unit 29 (step 507), and inhibits the detection of motion (step 508). Thereafter, the motion compensation lens group 3 is reset (step 509), and the series of operations relating to photography are completed.

On the other hand, in step 107, the operations when t1 (photographic preparatory time) is longer than T1 (stabilization time) proceed to step 602 of FIG. 6.

In step 107, when t1 has been determined to be longer than T1, the motion compensation drive circuit 28 immediately outputs a motion compensation signal, and commences driving the motion compensation lens 3 (step 602) via the motion compensation lens drive circuit 29. The exposure is then commenced (step 603) by driving the aperture 6 and the shutter 7. Thereafter, only when an amount of time equal to t2 remains (step 604) with respect to the whole exposure time t3 in the time t from the commencement of the exposure, the motion compensation calculating circuit 27, without waiting for the completion of the exposure, outputs an inhibition signal in order to inhibit motion compensation with respect to the motion compensation lens drive circuit 28, and inhibits the motion compensation lens group 3 via the motion compensation lens drive unit 29. Accordingly, time t2 can be considered to be the interval (i.e., motion tolerance time) of movement to a degree that the amount of movement of the image of the subject on the film plane during the exposure is imperceptible to the human eye and is therefore allowed to occur.

When the whole exposure time t3 has elapsed (step 606), the exposure calculation circuit 15 immediately causes the termination of the exposure and drives the aperture 6 and the shutter 7 (step 607) and inhibits the detection of motion (step 608). The motion compensation lens group 3 is reset (step 609) and the series of operations relating to photography are completed. Accordingly, by inhibiting the motion compensation of compensation routines prior to the end of an exposure, camera battery life is preserved.

Figure 3:
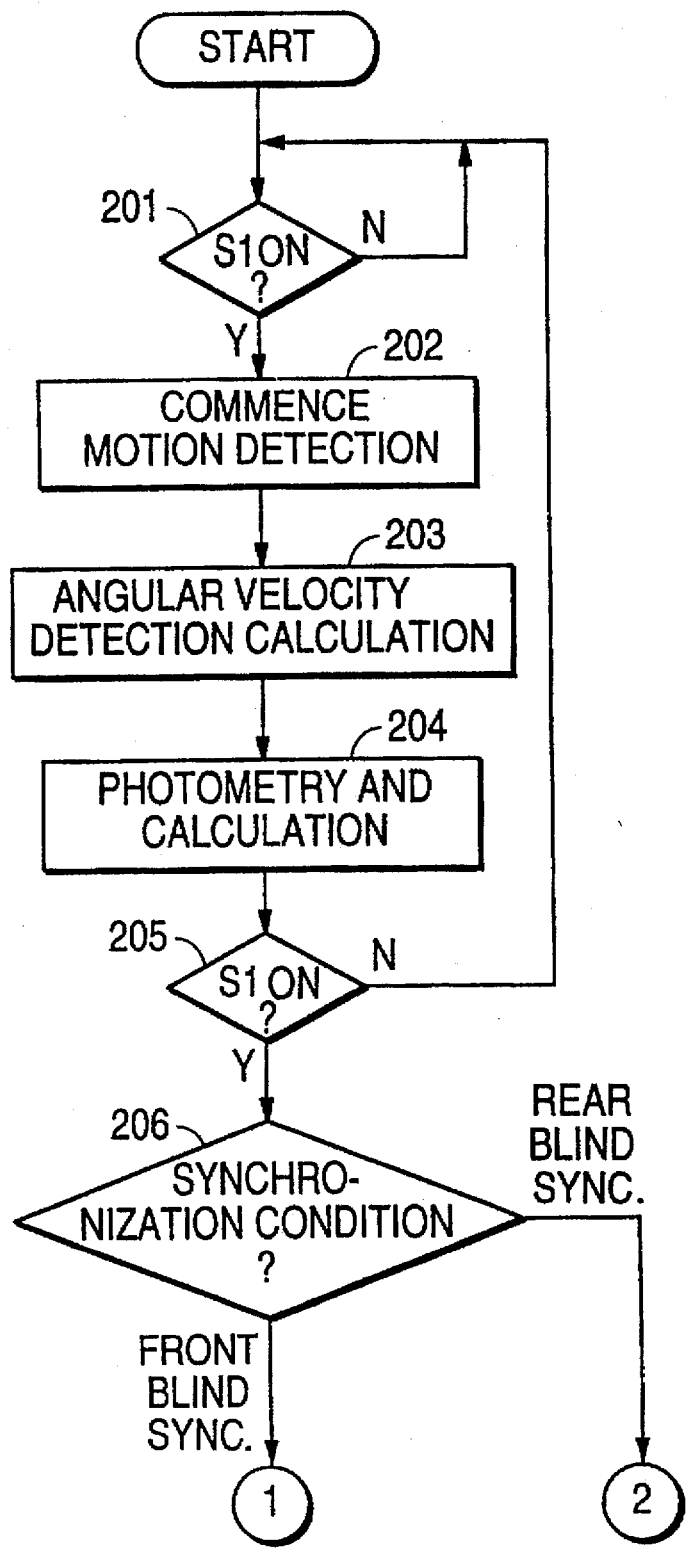
FIG. 3 is a flow chart that illustrates the operations of a control circuit of a motion compensation device according to a second embodiment of the present invention.

Referring now to FIG. 3, therein depicted is a flow chart that illustrates the operations of a control circuit of a motion compensating device according to a second embodiment of the present invention. Here, a light generating device is included and is described as one which generates flash-type light (e.g., a flash unit). The case in which the light generating device does not generate light is omitted as such a case is the same at that described in relation to the first preferred embodiment. Because steps 201 through 205 are the same as steps 101 through 105 in the first preferred embodiment, their description is omitted.

In step 205, after half depression (S1) has been confirmed, the exposure calculation circuit 15 inquires of the SB conditions determining unit 21 (step 206) about the conditions of light generation of the light generating device g, and confirms front blind synchronization or rear blind synchronization. In the case of front blind synchronization, the routine proceeds to (1), which is described below with reference to FIG. 5.

In FIG. 5, if full depression (S2) has been confirmed (step 501), processing becomes similar to step 502 as described in regard to the first embodiment depicted in FIG. 5.

At step 206, when rear blind synchronization is detected, processing proceeds to the routine shown in FIG. 6. In FIG. 6, if S2 is confirmed (step 601), processing proceeds to step 602 as described in regard to the first preferred embodiment depicted in FIG. 6. That is, prior to advancing to step 602 there is a loop to await full depression of the shutter release button of the camera.

Figure 4:
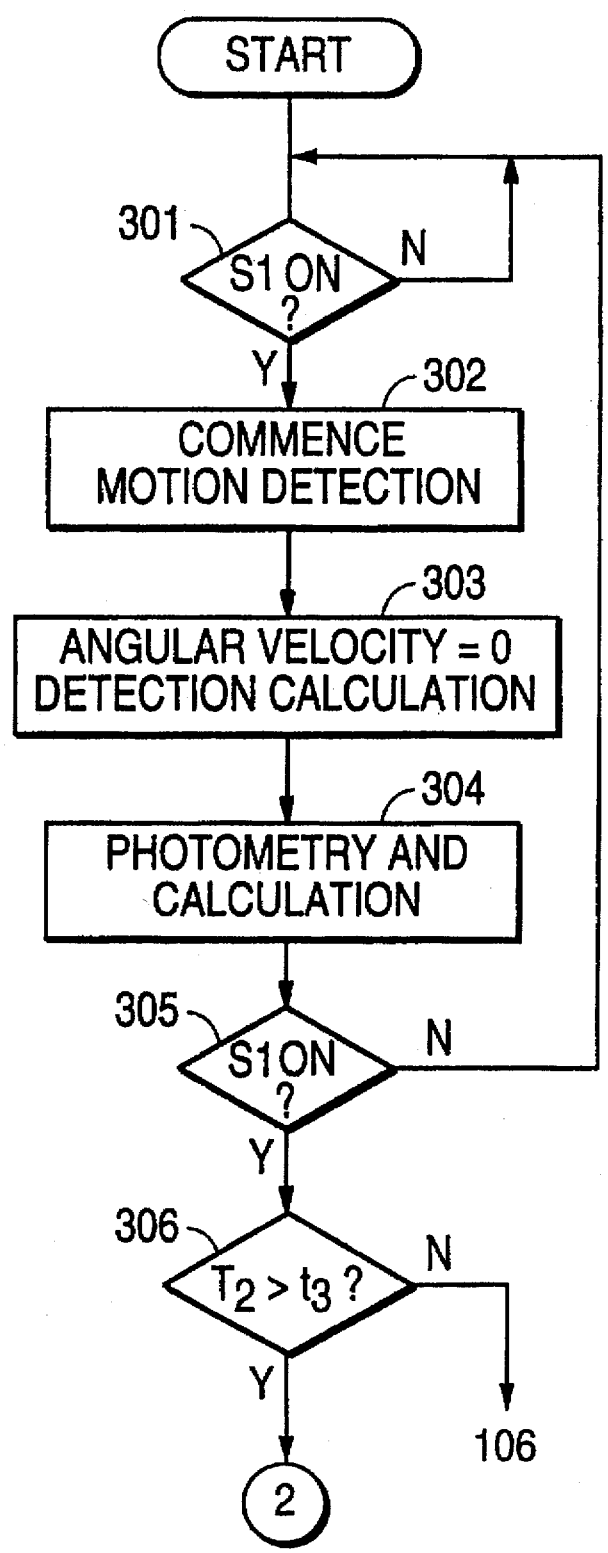
FIG. 4 is a flow chart that illustrates the operations of a control circuit of a motion compensation device according to a third embodiment of the present invention.

Referring now to FIG. 4, therein depicted is a flow chart that illustrates the operations of a control circuit of a motion compensating device according to a third embodiment of the present invention. Because steps 301 through 305 are the same as steps 101 through 105 of the first preferred embodiment, their description is omitted. At step 305, after half depression (S1) has been confirmed, the exposure calculation circuit 15 confirms, with respect to the long shutter time judgment unit 20, whether or not the whole exposure time t3 is a longer shutter time than the predetermined shutter time T2. Here, when it has been judged that it is a long shutter time (step 306), the processing proceeds to the routine shown in FIG. 6, and operations are performed in a manner similar to the second preferred embodiment discussed above in regard to FIG. 3.

At crop 306, when it is judged that the whole exposure time t3 is not longer than time T2, operations are performed completely the same as those defined at step 106 and thereafter.

In all of the embodiments discussed above, the identified time frames (i.e., T1, T2 and t2) can be configured to be changed in some way by way of setting unit(s) (not shown in the drawings) in order to facilitate different modes of operation and processing. For example, shutter times can be set according to the focal length f (mm) of the photographic lens 2 and with respect to a time (termed tf below) as a standard 1/f (s) (specifically, in the case that f=200 (mm), 1/200 (s)). That is, a setting unit can be arranged so that it can be changed by a manual switch stepwise, such as 4tf, 2tf, tf, tf/2, tf/4. Moreover, a time such as a standard time, of a fixed proportion within the whole exposure time, may be such that it can be changed stepwise, for example, such as +e,fra 1/10, 2/10, 3/10, 4/10, 5/10+ee .

In each of the embodiments discussed above, the time until angular velocity=0 or until an angular velocity sensor is stabilized comprises of a fixed time, or more. The reason for this is that the output of the sensor is not stable immediately after motion detection has begun, and therefore lacks certain reliability. Furthermore, as an example of the method of calculation of angular velocity=0, the average of the whole output from after detection begins can be taken, but some degree of time has to elapse for the accuracy of angular velocity to increase. Accordingly, the time until this value becomes stable is a judgment time constituting a standard time. Based on such a standard time, if the judgment time is increased or decreased the motion compensation can be made more or less accurate.

Furthermore, by a short or long judgment time, an increase or decrease of the motion compensation inhibition can be controlled. In other words, a camera that stabilizes quickly, is a camera wherein the motion during an exposure is small, and can therefore lengthen to stabilize the motion compensation inhibition time. Conversely, a person who takes a long time, because the blurring motion during the exposure is large can shorten the motion compensation inhibition time. in this manner, the motion compensation inhibition drive can be set according to a particular photographer and his skill.

Also, it is now possible to increase or decrease the motion compensation inhibition time according to the magnitude of the motion. For example, an interval in which the magnitude of the blurring motion on the film plane after the commencement of the exposure is less than 30 μm (generally, if a negative film is enlarged to a service size and then printed, such a 30 μm distance can be said to be the limit of magnitude which is perceptible to the human eye), without performance of motion compensation. By beginning motion compensation from the instant that it exceeds 30 μm, a photograph can be obtained with an amount of motion on the film plane which can substantially be kept to less than 30 μm during exposure.

Moreover, the amount of motion of the subject image on the film plane can be set by way of the setting unit 30 and can be input by a photographer (in other words, when the photographer desires a photograph with an amount of motion kept below an input threshold). For example, if the set amount is 30 μm, as mentioned above, after the beginning of exposure, the motion compensation drive can be set to commence when the subject image on the film plane has moved 30 μm.

Within an exposure time, because motion compensation is inhibited for a predetermined time directly after the commencement of exposure or directly before the completion of the exposure, there is a savings of electric power consumption and battery life. As such, the time for moving to the next photograph can be shortened.

Moreover, during the generation of light by a light generating device, or a fixed time before or after it, because no motion of the main subject occurs, by inhibiting the blurring motion compensation drive, wasteful energy of the electric battery can be prevented.

Furthermore, when the exposure time is long, motion compensation drive can be inhibited directly before the completion of an exposure and a photograph with less motion can be obtained.

Furthermore, with the above preferred embodiments of the present invention, a photographer can set the desired motion compensation inhibition time by means of a setting unit, and it is possible for the setting to consider the enlargement and the like when enlarged as a product for viewing and enjoyment.

Although preferred embodiments of the present invention have been shown and described, it will be readily appreciated by those skilled in the art that many changes and modifications may be made to such preferred embodiments without departing from the principles and spirit of the present invention, the scope of which is defined in the appended claims and their equivalents.

What is claimed is:

1. A motion compensating device adapted for use with a camera comprising:

an exposure time setting unit for setting a shutter speed within the camera;

a motion detection unit detecting motion about the camera;

a motion compensation unit driving an optical system of the camera in accordance with the motion detected by the motion detection unit;

a shutter time determination unit determining the exposure time set by the exposure time setting unit; and a control unit controlling the motion compensation unit so as to inhibit operation of the motion compensation unit when the shutter time determination unit has determined that the shutter speed set by the exposure time setting unit is greater than a predetermined time, the inhibition of the motion compensation unit lasting for as long as a tolerance time such that the amount of movement of the image on a film plane moves to an imperceptible degree and directly before an exposure completion which has been set by the exposure time setting unit.

2. The motion compensation device of claim 1, wherein the shutter time determination unit further comprises a setting unit for setting the predetermined time.

3. The motion compensation device of claim 1, wherein the control unit has a motion tolerance time setting unit for setting a tolerance time in which motion will be tolerated.

* * * * *